(12) United States Patent
Zemlyak et al.

(10) Patent No.: US 6,604,189 B1
(45) Date of Patent: Aug. 5, 2003

(54) MASTER/SLAVE PROCESSOR MEMORY INTER ACCESSABILITY IN AN INTEGRATED EMBEDDED SYSTEM

(75) Inventors: Boris Zemlyak, Cupertino, CA (US); Ariel Cohen, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/576,575

(22) Filed: May 22, 2000

(51) Int. Cl.[7] .................. G06F 15/163; G06F 15/167; G06F 13/16
(52) U.S. Cl. .............. 712/31; 712/229; 709/211; 709/216; 711/148
(58) Field of Search .................. 712/227, 31, 43, 712/229; 709/216, 209, 208, 222, 211; 711/148, 152

(56) References Cited

U.S. PATENT DOCUMENTS 4,752,870 A * 6/1988 Matsumura ............ 709/222
6,101,598 A * 8/2000 Dokic et al. ............ 712/227
6,253,233 B1 * 6/2001 Hayashi ............... 709/216

* cited by examiner

*Primary Examiner*—Daniel H. Pan
(74) *Attorney, Agent, or Firm*—Christopher P. Maiorana, PC

(57) ABSTRACT

An apparatus comprising one or more first processors and one or more second processors. The one or more first processors may each comprise a first random access memory (RAM) sections. The one or more second processors may each comprise a read only memory (ROM) section and a second RAM section. The one or more first processors may be configured to operate in either (i) a first mode that executes code stored in the one or more ROM sections or (ii) a second mode that processes code stored in the one or more first RAM sections. The one or more second processors may be configured to execute code from either (i) the one or more ROM sections or (ii) the one or more second RAM sections. The apparatus may provide interoperability that may increase system observability and decrease system debugging complexity.

20 Claims, 3 Drawing Sheets

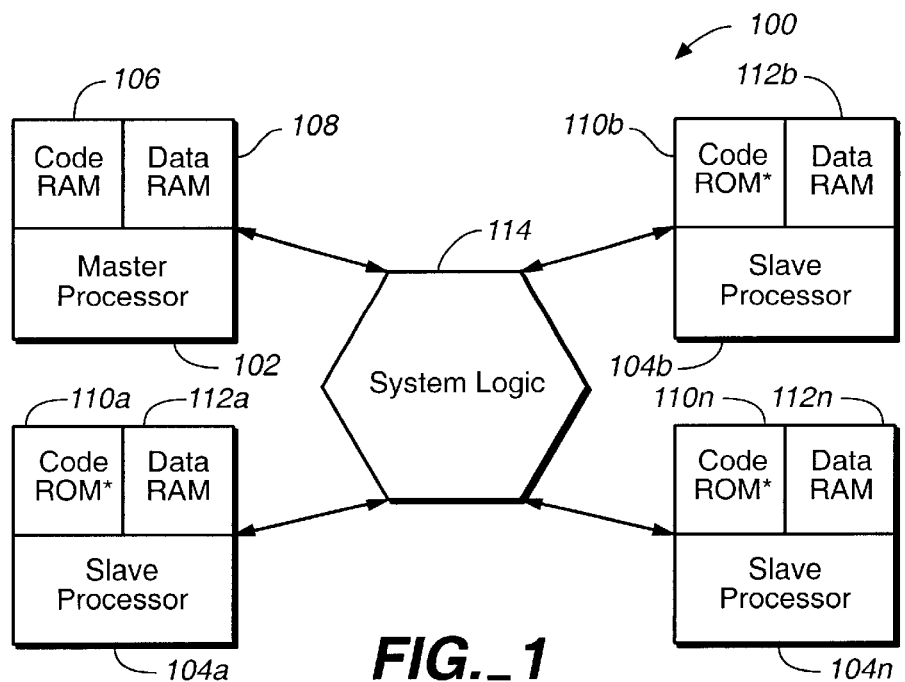
FIG._1
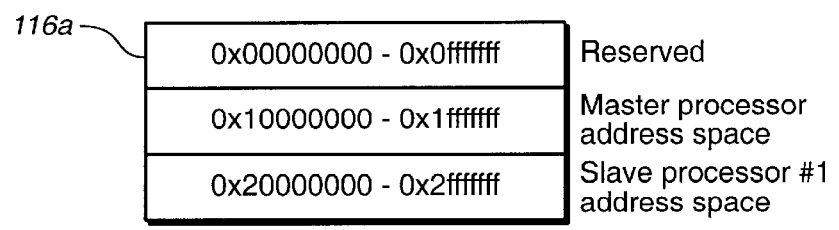
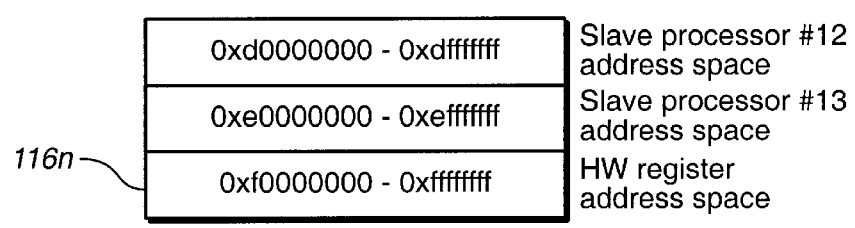
FIG._2

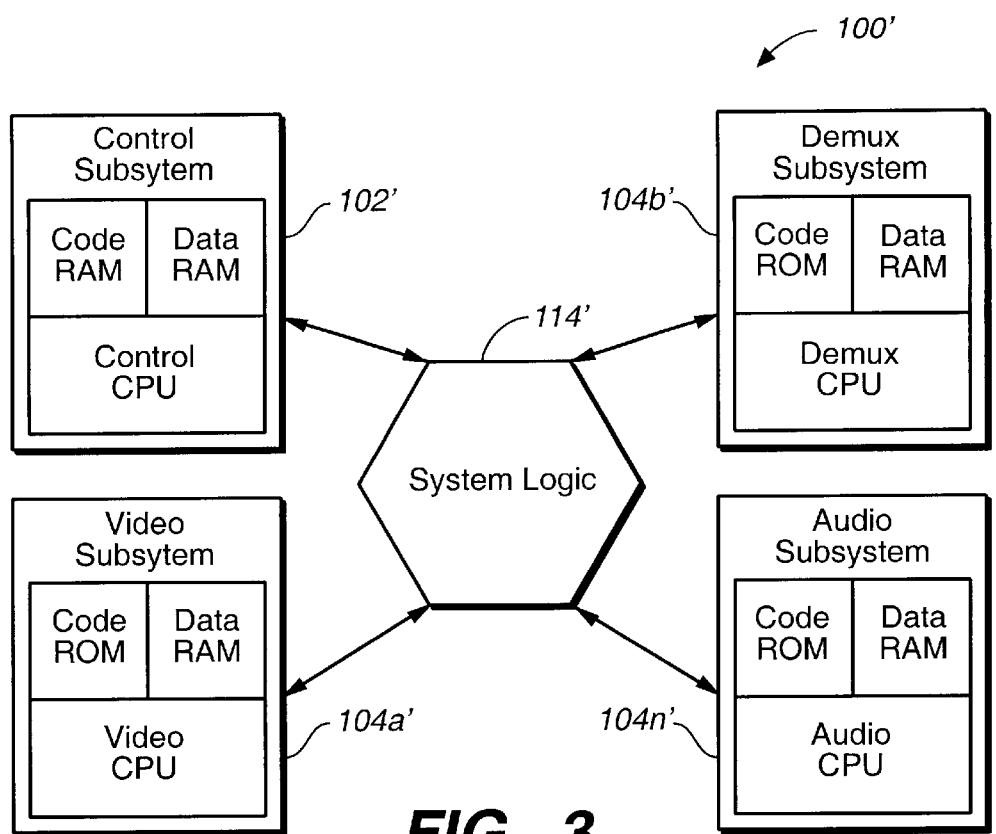
FIG._3

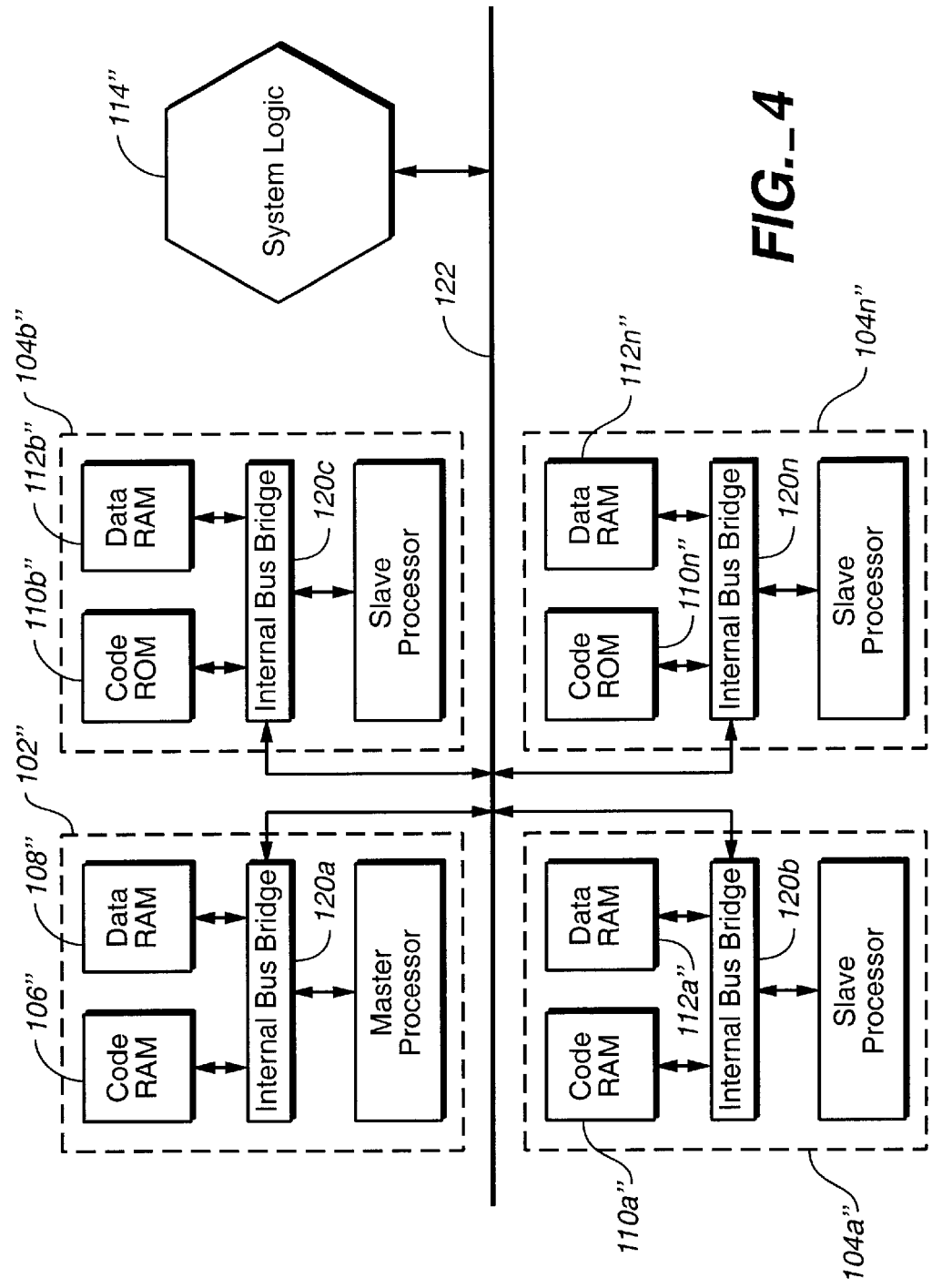
FIG._4

US 6,604,189 B1

MASTER/SLAVE PROCESSOR MEMORY INTER ACCESSABILITY IN AN INTEGRATED EMBEDDED SYSTEM

FIELD OF THE INVENTION

The present invention relates to a method and/or architecture for a master/slave processor memory generally and, more particularly, to a method and/or architecture for a master/slave processor memory with inter-accessability in an integrated embedded system.

BACKGROUND OF THE INVENTION

Conventional embedded systems can contain two or more identical processors. Such systems typically dedicate N-1 slave processors to specific tasks, while the Nth processor is a general purpose processor. The general purpose processor is used as a host (master) CPU for the N-1 slave processors. In such conventional multiprocessor systems, the N-1 slave processors typically run ROM based code. As a result, the N-1 slave processors have very low observability. Additionally, debugging of the multiprocessor system with ROM based code is a very complicated task, especially when the slave processors do not have special debugging hooks.

It may be desirable to provide (i) improved observability and (ii) improved debugging process in an integrated embedded system.

SUMMARY OF THE INVENTION

The present invention concerns an apparatus comprising one or more first processors and one or more second processors. The one or more first processors may each comprise a first random access memory (RAM) section. The one or more second processors may each comprise a read only memory (ROM) section and a second RAM section. The one or more first processors may be configured to operate in either (i) a first mode that executes code stored in the one or more ROM sections or. (ii) a second mode that processes code stored in the one or more first RAM sections.

The objects, features and advantages of the present invention include providing a method and/or architecture for implementing an integrated embedded system that may (i) allow increased observability and decreased debugging complexity of ROM based code, (ii) allow RAM based code debugging to be utilized instead of ROM based debugging, (iii) implement software breakpoints and/or (iv) provide inter operability of processors and memories in multiprocessor embedded systems.

BRIEF DESCRIPTION OF THE DRAWINGS

These and other objects, features and advantages of the present invention will be apparent from the following detailed description and the appended claims and drawings in which:

FIG. 1 is a block diagram of a preferred embodiment of the present invention;

FIG. 2 is a table illustrating address space division in accordance with the present invention;

FIG. 3 is a block diagram of an alternate embodiment of the present invention; and FIG. 4 is a block diagram of an alternate embodiment of the present invention.

DETAILED DESCRIPTION OF THE PREFERRED EMBODIMENTS

Many embedded systems contain two or more identical processors. In one example, N-1 processors may be dedicated to specific tasks, while the Nth processor may be a general purpose processor. In another example, N-X processors may be dedicated to specific tasks, while X processors may be general purpose processors. The general purpose processor(s) may be implemented as host CPUs for the N-1 (N-X) processors. In such multiprocessor systems, slave processors (e.g., the N-1 (N-X) processors) typically run ROM based code. The N-1 (N-X) slave processors running the ROM based code may have low observability. Additionally, the ROM based code of the N-1 (N-X) slave processors may be difficult to debug (e.g., software breakpoints can not be used). The present invention may provide a technique that may (i) significantly increase observability and (ii) decrease debugging complexity of ROM based code running on the N-1 (N-X) slave processors.

The present invention may relate to multiprocessor embedded systems that may contain several identical and/or similar processors. In a preferred embodiment, the present invention may implement one or more of the processors as slave processors and one or more of the processors as a master processor. However, the particular number of slave and/or master processors may vary in order to meet the criteria of a particular implementation.

The slave processors generally run ROM based code. Each of the slave processors may be dedicated to perform a specific (and constant) task. The master processor is generally responsible for the overall control of the entire system. The master processor may run RAM based application code. The RAM based application code may differ for each application in which the system is implemented. The slave processors generally run fixed code (e.g., ROM code), independent of the specific system and/or application.

Referring to FIG. 1, a multiprocessor embedded system 100 is shown. In one example, the system 100 may be integrated on a single device or integrated circuit (IC). The system 100 generally comprises a first processor (e.g., a master processor 102) and a number of second processors (e.g., slave processors 104a–104n). The master processor 102 is shown including a code RAM 106 and a data RAM 108. Each of the slave processors 104a–104n is shown including a code ROM 110a–110n and a data RAM 112a–112n. Additionally, the multiprocessor embedded system 100 may implement a system logic block 114. The system logic 114 may connect the master processor 104 and the slave processors 104a–104n. The system logic 114 may allow the master processor 102 to control an operation of the slave processors 104a–104n. The multiprocessor embedded system 100 may be implemented as, in one example, a master/slave processor memory inter-accessability embedded system.

Observability of the slave processors 104a–104n during normal operation (e.g., a first mode) is generally low. The low observability of the slave processors 104a–104n may force code debugging to be very complicated. The system 100 may resolve the observability and debugging issues by enabling a second mode (e.g., a specialized mode) of system operation. The second mode may allow the master processor 102 to run the ROM code of any of the slave processors 104a–104n. The master processor 102 may run the ROM code of the slave processors 104a–104n via the code RAM 106 and/or the data RAM 108. The master processor 102 may have access to the code ROMs 110a–110n and/or the data RAMs 112a–112n of any of the slave processors 104a–104n. Also, the slave processors 104a–104n may run code from the code RAM 106 and/or the data RAM 108 of the master processor 102. The slave processors 104a–104n may run the RAM code via the code ROMs 110a–110n and/or the data RAMs 112a–112n.

In order to enable the master processor 102 to run the ROM code of any of the memories (e.g., 110a–110n and/or 112a–112n) of the slave processors 104a–104n, one or more of the following issues may need to be resolved (i) address spacing of different processors; (ii) notification of which code to execute following a reset; and/or (iii) how interrupts are to be processed. The system 100 may provide a solution to these issues.

Regarding the issue of address spacing of different processors, the system 100 may provide arbitration of the address spaces. The processors 102 and 104a–104n may implement any appropriate addressing mode/scheme in order to meet the criteria of a particular implementation. In one example, the processors 102 and 104a–104n may implement 32-bit addressing. The 32-bit addressing may allow the entire address space to be divided into non-overlapping pieces, where each piece generally belongs to a specific processor (e.g., the processor 102 or the processors 104a104n). In another example, the processors 102 and 104a–104n may implement memory mapped hardware control. The memory mapped hardware control may implement unique hardware control register addresses for each address space of the system 100 (to be described in more detail in connection with FIG. 2). For example, there may not be two identical hardware control register addresses in the system 100. Such an arrangement may allow each processor to access any system hardware register and any memory in the system 100.

Referring to FIG. 2, an example of a hardware register implemented as 32-bit address spacing is shown. The hardware register is shown divided into a number of sub-spaces 116a–116n. In one example, the sub-spaces 116a–116n may be divided into non-overlapping sub-spaces for master processors, slave processors and hardware memory mapped registers. For example, the sub-space 116a may be reserved for future use, the sub-space 116b may be reserved for the master processor 102, the sub-spaces 116c–116(n-1) may be reserved for the slave processors 104a–104n, and the sub-space 116n may be reserved for memory mapped hardware control. However, other configurations may be implemented to meet the design criteria of a particular implementation.

Regarding the issue of notification of the proper code to execute, there may be at least two possible options to inform a particular slave processor 104a–104n (or the master processor 102) which code is to be executed. One option may be to bootstrap the processor 104a–104n (or 102). The bootstrap may control the first address fetched by the particular processor 104a–104n (or 102) after the reset. Such bootstrapping may be initialized by the slave processor 104a–104n in either (i) the respective code ROM 110a–110n or (ii) a location within the code RAM 106 of the master processor 102.

Another option may be to implement a first predetermined number (e.g., a dozen memory words) corresponding to the first addresses fetched after the reset, to be stored in RAM (e.g., data RAMs 108 and 112a–112n) and not in the code ROMs 110a–110n. The very first instruction to be executed may jump to the code ROM 110a–110n and/or the code RAM 106 of the master processor 102. Such an option may allow the master processor 102 to download the jumping instruction before the particular slave processor 104a–104n exits the reset sequence.

Regarding the issue of interrupt processing, the system 100 may prevent potential interrupt processing. The slave processors 104a–104n when running RAM code from the code RAM 106 of the main processor 102 may have a conflict if an ISR address vector has a fixed address (e.g., 0×10000000–0×1ffffff of FIG. 2). One option to prevent such a conflict may be to implement a bootstrap to control the location of the ISR address vector. Another option to prevent the conflict may be to have the ISR vector located in the data RAM 112a–112n and downloaded (e.g., by a master processor 102 before the slave processor 104a–104n exits from the reset sequence) to point to ISR vectors located in the code RAM 106 of the master processor 102.

When the master processor 102 is generally processing code from one of the slave processors 104a–104n, interrupts arriving to the particular slave processor 104a–104n may be addressed. Typically, interrupts for the slave processors 104a–104n may be ignored. However, when interrupts for the slave processors 104a–104n cannot be ignored, hardware hooks may be added. Such hardware hooks may map the interrupts of a particular slave processor 104a–104n to an interrupt service portion of the master processor 102.

Referring to FIG. 3, an alternate embodiment of the present invention, marked with primed notation, is shown. The embedded system 100' may be implemented as an MPEG audio/video decoder and demultiplexer 100'. The master processor 102' may be implemented as a control subsystem. The slave processors 104a'–104n' may be implemented as a video subsystem, a demultiplexer subsystem and an audio subsystem, respectively. However, other subsystems may be implemented accordingly to meet the design criteria of a particular implementation. The system logic 114' may allow the control subsystem 102' to control the subsystems 104a'–104n'.

Referring to FIG. 4, another alternate embodiment of the present invention, marked with double primed notation, is shown. The system 100" may be implemented, in one example, as a multiprocessor integrated embedded system with inter processor memory accessability. The system 100" may be implemented with a number of internal bus bridges 120a–120n. The internal bridges may allow each of the processors 102" and 104a"–104n" and the system logic block 114" to communicate through a bus 122. If the master processor 102" and the slave processors 104a"–104n" are of a different architecture and/or different instruction set, some arbitration logic may be required for proper communication. The required arbitration may be provided by the system logic block 114" and the master processor 102".

For example, if the master processor 102" cannot execute code from one or more of the code ROMs 110a"–110n" and the data RAM 112a"–112n" of the particular slave processor 104a"–104n" is still accessible for read/write, then the particular code of slave processor 104a"–104n" may be downloaded into the code RAM 106" or the data RAM 108" of the master processor 102". The slave processor 104a"–104n" may then execute the downloaded code from the master processor 102". Hence, when the master processor 102" and the slave processors 104a"–104n" are of a different architecture and/or have a different instruction set, the system 100 (or 100") may provide increased observability of a particular slave processor 104a"–104n". The increased observability may ease the debugging process.

The present invention may provide inter-operability of processors and memories in multiprocessor embedded system. The system 100 may allow increased observability and decreased debugging complexity of ROM based code running on, in one example, an embedded processor in a multiprocessor system. The present invention may allow a decrease in complexity of debugging of such a system, and may allow RAM based code debugging to be used instead of ROM based debugging. The RAM based code debugging may allow the system 100 to use software breakpoints.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   one or more first processors each comprising a first random access memory (RAM) section; and
   one or more second processors each comprising a read only memory (ROM) section and a second RAM section, wherein said one or more first processors are each configured to operate in either (i) a first mode that executes code stored in said one or more ROM sections or (ii) a second mode that processes code stored in said one or more first RAM sections.

2. The apparatus according to claim 1, wherein said one or more first processors each comprise a master processor and said one or more second processors each comprise slave processors.

3. The apparatus according to claim 1, wherein said one or more second processors execute code stored in at least one of said one or more first processors.

4. The apparatus according to claim 1, wherein said at least one of said one or more first processors processes application specific code.

5. The apparatus according to claim 4, wherein said application specific code is stored in said one or more RAM sections.

6. The apparatus according to claim 1, wherein said one or more slave processors process fixed code.

7. The apparatus according to claim 6, wherein said fixed code is stored in said ROM sections.

8. The apparatus according to claim 1, wherein at least one of said one or more first processors processes application specific code and said one or more second processors process fixed code, wherein said one or more second processors are configured to read said application specific code.

9. The apparatus according to claim 8, wherein said one or more first processors and said one or more second processors operate in one of a plurality of addressing modes.

10. The apparatus according to claim 8, wherein said one or more first processors and said one or more second processors operate in a memory mapped hardware control mode.

11. The apparatus according to claim 8, further comprising:
    a plurality of address spaces each specific to a portion of said one or more first processors or a portion of said one or more second processors.

12. The apparatus according to claim 1, further comprising:
    a logic circuit coupled to at least one of said one or more first processors and said one or more second processors.

13. The apparatus according to claim 1, wherein at least one of said one or more first processors is further configured to notify said one or more second processors after a reset.

14. The apparatus according to claim 13, wherein said notification determines which code is executed.

15. An apparatus comprising:
    means for processing code comprising one or more first processors each comprising a Random Access Memory (RAM) section; and
    means for processing code comprising one or more second processors each comprising a Read Only Memory (ROM) section and a RAM section, wherein said one or more first processors are each configured to operate in either (i) a first mode that executes code stored in the one or more ROM sections or (ii) a second mode that processes code stored in said one or more first RAM sections.

16. A method for implementing interaccessable processors, comprising the steps of:
    (A) processing code comprising one or more first processors each comprising a Random Access Memory (RAM) sections; and
    (B) processing code comprising one or more second processors each comprising a Read Only Memory (ROM) section and a RAM section, wherein said one or more first processors are each configured to operate in either (i) a first mode that executes code stored in said one or more ROM sections or (ii) a second mode that processes code stored in said one or more first RAM sections.

17. The method according to claim 16, wherein (i) step (A) further comprises processing application specific code and (ii) step (B) further comprises processing fixed code, wherein step (B) is further configured to read said application specific code.

18. The method according to claim 16, wherein step (A) and step (B) are further configured to operate in one of a plurality of addressing modes.

19. The method according to claim 16, wherein step (A) and step (B) are further configured to operate in a memory mapped hardware control mode.

20. The method according to claim 16, further comprising the step of:
    (C) providing a plurality of address spaces each specific to a first portion of said one or more first processors or a second portion of said one or more second processors.

* * * * *